United States Patent [19]

Rediker, Jr. et al.

[11] Patent Number: 4,750,465

[45] Date of Patent: Jun. 14, 1988

[54] FUEL VAPOR STORAGE CANISTER

[75] Inventors: Frank J. Rediker, Jr., Sterling Heights; Roger G. VanVechten, St. Clair Shores, both of Mich.

[73] Assignee: General Motors Corporation, Detroit, Mich.

[21] Appl. No.: 80,502

[22] Filed: Jul. 31, 1987

[51] Int. Cl.[4] ...................... F02M 39/00; B01D 53/04

[52] U.S. Cl. .................................... 123/519; 123/520; 55/387

[58] Field of Search ............... 123/519, 520, 521, 518, 123/516; 55/387, 418

[56] References Cited

U.S. PATENT DOCUMENTS

| | | | |
|---|---|---|---|
| 3,646,731 | 3/1972 | Hansen | 123/519 |
| 3,675,634 | 7/1972 | Tasutomi | 123/519 |
| 3,913,545 | 10/1975 | Haase | 123/520 |
| 4,058,380 | 11/1977 | King | 123/519 |
| 4,212,276 | 7/1980 | Kaneda | 123/519 |
| 4,338,106 | 7/1982 | Mizuno | 123/519 |
| 4,403,587 | 9/1983 | Mizuno | 123/519 |
| 4,658,796 | 4/1987 | Yoshida | 123/519 |

FOREIGN PATENT DOCUMENTS

| | | | |
|---|---|---|---|
| 0165757 | 12/1981 | Japan | 123/518 |
| 0119956 | 7/1983 | Japan | 123/519 |
| 1217347 | 12/1970 | United Kingdom | 123/520 |

*Primary Examiner*—Carl S. Miller
*Attorney, Agent, or Firm*—Patrick M. Griffin

[57] ABSTRACT

An improved vapor storage canister includes a single fill purge tube that extends down through the bed, nearly to the bottom of a reservoir in the center of a cone shaped shell enclosing the bottom of the canister. Liquids entering the canister are consolidated and collected at the bottom, and drawn out first during purge, to protect the bed from contamination. The working of the absorbent bed is more efficient, since the vapors concentrate toward the bottom, where the purge point is, and since purge air is drawn in through the same pattern in which vapors were initially absorbed during fill.

2 Claims, 3 Drawing Sheets

FUEL VAPOR STORAGE CANISTER

This invention relates to vehicle fuel system evaporative loss control in general, and specifically to a fuel vapor storage canister that has increased efficiency and useful life.

BACKGROUND OF THE INVENTION

Vehicle fuel systems generally include a provision for controlling evaporative losses from the fuel tank, typically a fuel vapor storage canister that includes a bed of vapor adsorbent material, such as activated charcoal granules. The fuel sitting in the fuel tank, because of temperature differentials, produces a mixture of fuel, air vapor, and even liquid fuel and water components. This mixture, which must be vented in order to control the tank pressure, is routed through the canister, where the fuel vapor component is stored by adsorption in the bed, while the air is vented to atmosphere. Later, engine vacuum is used to purge the canister by drawing in atmospheric air to desorb the fuel vapor and direct it to the engine combustion air intake to be burned.

There are limitations on the efficiency and useful life of the conventional canisters just described. One problem is that there is no particular provision for handling the liquid fuel and water components of the mixture that is fed into the canister from the tank. These liquid components can contaminate the adsorbent bed, reducing its efficiency and useful life. Another shortcoming is that most known canisters both fill and purge the canister from the top. Therefore, with time the adsorbed vapors migrate through the entire bed, with the heaviest concentration of stored vapors sinking toward the bottom. Therefore, when purge occurs, the heaviest concentration of stored vapors is not nearest the purge point, which is not most efficient. In known prior art canisters that do both fill and purge from the bottom of the canister, there are separate fill and purge tubes, so that the heaviest concentration or distribution of stored vapors is still not nearest the purge point.

SUMMARY OF THE INVENTION

The invention provides an improved storage canister including a means that both protects the adsorbent bed against the type of liquid contamination described, and which also provides for filling and purging the fuel vapor adsorbent bed with maximum efficiency and capacity.

The preferred embodiment of the fuel vapor storage canister of the invention disclosed is used in a typical vehicle fuel system that has a fuel tank and a source of engine vacuum. The canister has a generally cylindrical housing and a bed of fuel vapor adsorbent activated charcoal granules retained inside the housing between a pair of screens. Therefore, the adsorbent bed presents an upper and a lower face inside the canister. The canister housing is enclosed at the top by a top wall, through which an air vent opens to provide a communication of the adsorbent bed upper face to atmosphere. The bottom of the canister housing is enclosed by a generally cone shaped shell that forms a plenum beneath the adsorbent bed lower face. The apex of the cone provides a centrally located liquid consolidating reservoir beneath the adsorbent bed lower face. A single fill-purge tube extends centrally through the housing top wall and the adsorbent bed, generally coaxial to the canister housing. At is upper end, the single tube is connected both to the fuel tank and to vehicle engine vacuum. The lower end of the single tube extends through the adsorbent bed lower face to a single opening located centrally within the plenum and very near the apex of the cone shaped shell.

In operation, when the tank vents into the canister, the mixture described enters the plenum centrally through the single tube opening. Any liquid component of the mixture continuously collects and funnels to the apex of the cone, consolidating so as to present an area of liquid to the lower face of the adsorbent bed that is smaller than and removed from the adsorbent bed lower face. This consolidation of the liquid away from the adsorbent bed protects it from contamination, protection that is optimized by the way in which the cone shaped shell and reservoir continuously fill. Concurrently, the fuel vapor component of the mixture exits the single tube opening and is adsorbed in the bed from the lower face upwardly, in a distribution that is concentrated toward the center and lower face of the bed, that is, near the single tube opening. When engine vacuum is introduced through the single tube, it first removes liquid from a point near the apex of the cone, since the opening of the tube will be immersed in any liquid that is present. The reservoir empties continuously from the bottom, removing substantially all of the liquid present as it funnels toward the reservoir. After the liquid is purged, fresh air is drawn in through the top, and the fuel vapors are desorbed. The efficiency of the desorption process and the working capacity of the bed are significantly assisted by two features of the invention. First, the heaviest concentration of vapors, which is most in need of desorption, is nearest the single tube opening, a concentration and distribution which the effect of gravity over time only acts to increase. Second, because of the single fill purge opening and its central location beneath the lower face of the bed, the purge path is substantially the same as was the fill path, but in reverse order, and desorption occurs exactly where needed, that is, where there was adsorption during fill.

It is, therefore, a general object of the invention to increase the efficiency and useful life of the adsorbent bed of a fuel vapor storage canister by protecting it against liquid contamination and by filling and purging it in the most efficient manner.

It is another object of the invention to provide both features by means of a cooperating central reservoir located below the adsorbent bed and a single fill purge tube that extends through the lower face of the bed to a single central opening in the reservoir, so that, during fill, liquids are continuously consolidated away from the lower face of the adsorbent bed and the adsorbed fuel vapors are concentrated nearest the single tube opening, while, during purge, the single fill tube opening first removes liquids from the reservoir, and then desorbs the stored fuel vapors from the bed with good efficiency, because the fresh, purge air is drawn in through the same areas in which vapors were stored, and since the heavier concentrations of stored vapors are nearest the single tube opening.

It is yet another object of the invention to provide the central reservoir in a cone shaped shell and to locate the single tube opening near the apex of the cone, so that liquids are continuously collected and consolidated away from the adsorbent bed during fill for optimal protection from contamination, and are also removed with optimal efficiency during purge.

DESCRIPTION OF THE PREFERRED EMBODIMENT

These and other objects and features of the invention will appear from the following written description, and from the drawings, in which.

Figure 1:
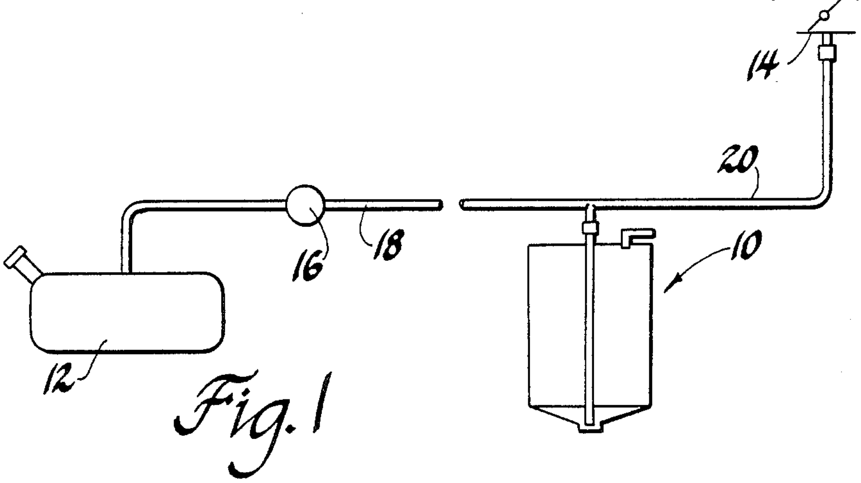
FIG. 1 is a schematic representation of a vehicle fuel system employing the storage canister of the invention.

Referring first to FIG. 1, a preferred embodiment of the invention, designated generally at 10, is incorporated between a vehicle fuel tank 12 and the combustion air intake 14 of a vehicle engine. When the pressure of the air-fuel vapor mixture formed in tank 12 exceeds the threshold pressure of a tank pressure control valve 16, the mixture is vented to canister 10 through tank vent line 18, where the fuel vapor component is stored in a manner more fully described below. When the vehicle is operating, engine vacuum from 14 acts through purge line 20 to desorb the stored fuel vapors. Details of canister 10 will be described next.

Figure 2:
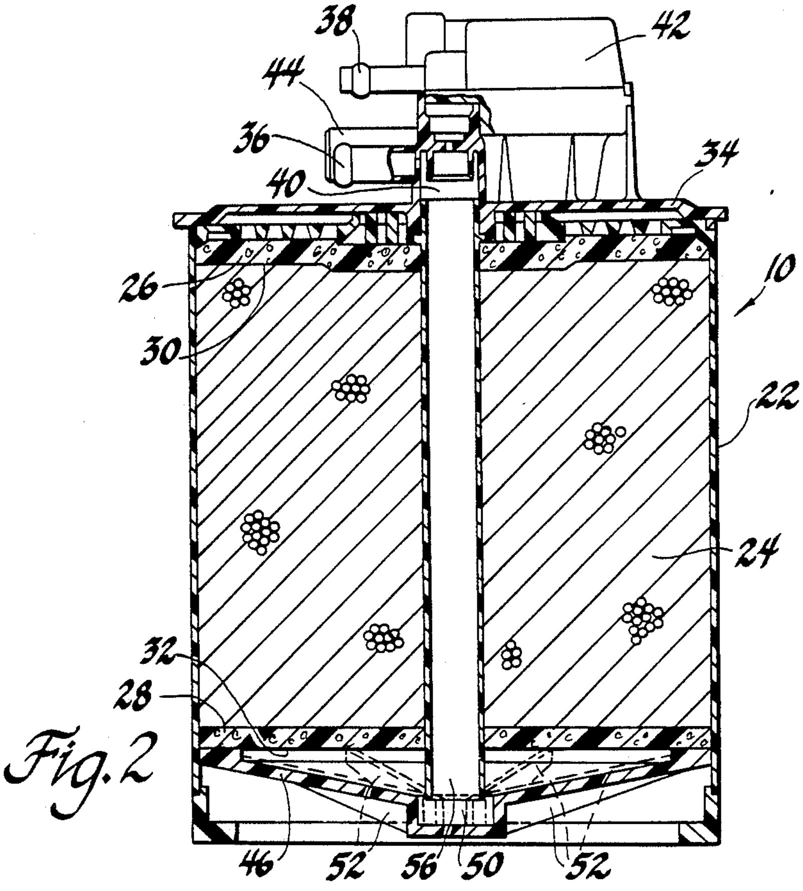
FIG. 2 is a sectional elevational view of a preferred embodiment of the canister.

Referring next to FIG. 2, canister 10, the various parts of which are molded of plastic or other suitable material, is generally cylindrical, with a housing 22 inside of which is a cylinder shaped bed of fuel vapor adsorbent activated charcoal granules, designated generally at 24. Adsorbent bed 24 is retained between upper and lower screens 26 and 28, and thereby presents upper and lower planar faces 30 and 32 respectively within canister 10. Screen 28 is not illustrated in later figures, so as to better show the storage and migration of vapors. Canister housing 22 is enclosed at the top by a top wall 34, which is spaced from and forms an air space with upper screen 26. Molded to top wall 34 are a tank vent line inlet filling 36 and an purge line filling 38, which both open to a common passage 40 that opens through top wall 34. Purge line filling 38 is selectively closed off from passage 40 by a solenoid valve 42, for a purpose described below. Top wall 34 also includes a fresh air inlet 44 therethrough which communicates the adsorbent bed upper face 30 to atmosphere. The bottom of canister housing 22 is enclosed by cone shaped shell 46, which is inverted. The rim of shell 46 is tightly joined to the inside of housing 22, and therefore forms a plenum 48 beneath adsorbent bed lower face 32. Shell 46 drops down at its apex to form a generally cylindrical, centrally located liquid consolidating reservoir, designated at 50. Several ribs 52 surround reservoir 50 but do not close it off. A single fill-purge tube 54 extends from passage 40 coaxially through adsorbent bed 24, ending at a single round lower opening 56. Tube opening 56, which is approximately 0.380 inches in diameter, is rigidly supported at the end by ribs 52. Because of the coaxial, central location of tube 54, tube opening 56 is located centrally within both plenum 48 and reservoir 50, and also near the bottom of reservoir 50, spaced about 0.250 inches from the lowest point thereof.

Figure 3:
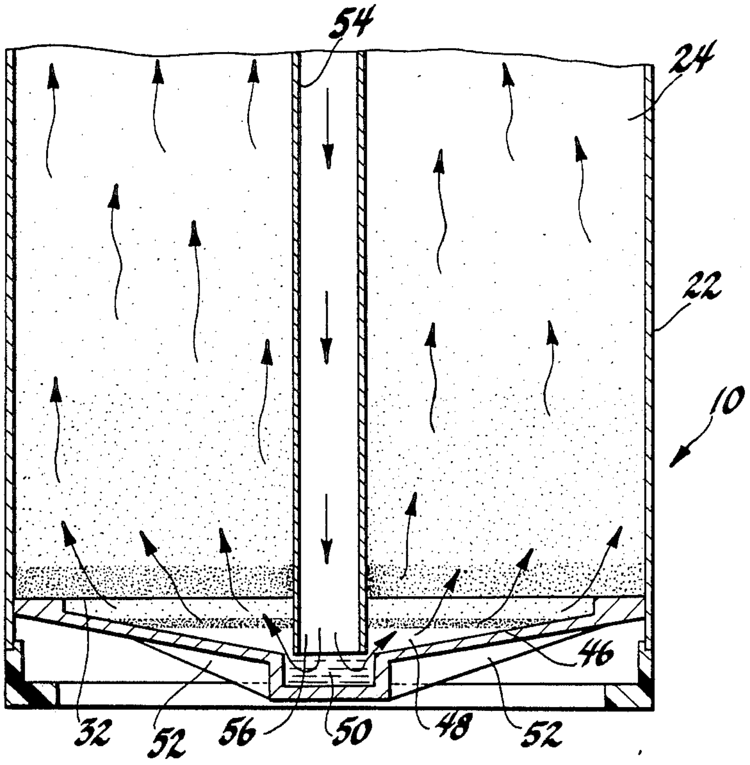
FIG. 3 is a view similar to FIG. 2, but showing only the adsorbent bed and lower part of the canister, illustrating the inflow of fuel-vapor mixture to the canister.

Referring next to FIGS. 1, 2 and 3, as the fill process begins, the pressure in tank 12 opens valve 18, and the mixture described above enters tube 54 through inlet fitting 36 and passage 40, its movement into line 20 being blocked by the then closed solenoid valve 42. As represented by the arrows, the mixture moves axially down tube 54 and enters the plenum 48 through the single tube opening 56. The liquid component of the mixture collects in reservoir 50, and the very heaviest vapors hang over the liquid, as represented by the stippling. The lighter fuel vapor and air components of the mixture, meanwhile, begin to migrate toward upper face 30, as shown by the arrows, with the fuel vapor being adsorbed in bed 24 and the air venting to atmosphere through fresh air inlet 44. The final adsorption result will be described in more detail below. Because of the configuration of the central reservoir 50 and the cone shaped shell 46, the collected liquid, be it fuel or water, continuously funnels toward the center and consolidates to present a reduced liquid surface area to the adsorbent bed lower face 32, a surface area that is also spaced away from lower face 32. This may be contrasted with known flat bottomed canisters, in which any liquid collected at the bottom, even if spaced away from the lower face 32, would present a surface area as large as the lower face 32. This continuous consolidation and reduction of the liquid in reservoir 50 provides maximum, optimal protection of bed 24 from liquid contamination. This consolidation will continue even if liquid overflows reservoir 50, unless and until the liquid entirely fills plenum 48. However, it should be kept in mind that as the liquid expands out into plenum 48, its rate of axial climb toward lower face 32 decreases, since the diameter of the cone increases. Furthermore, the volume of reservoir 50 and plenum 48 is large enough so that the volume of liquid should not entirely fill plenum 48 under ordinary circumstances, especially in light of the way in which canister 10 is purged, as will appear below.

Figure 4:
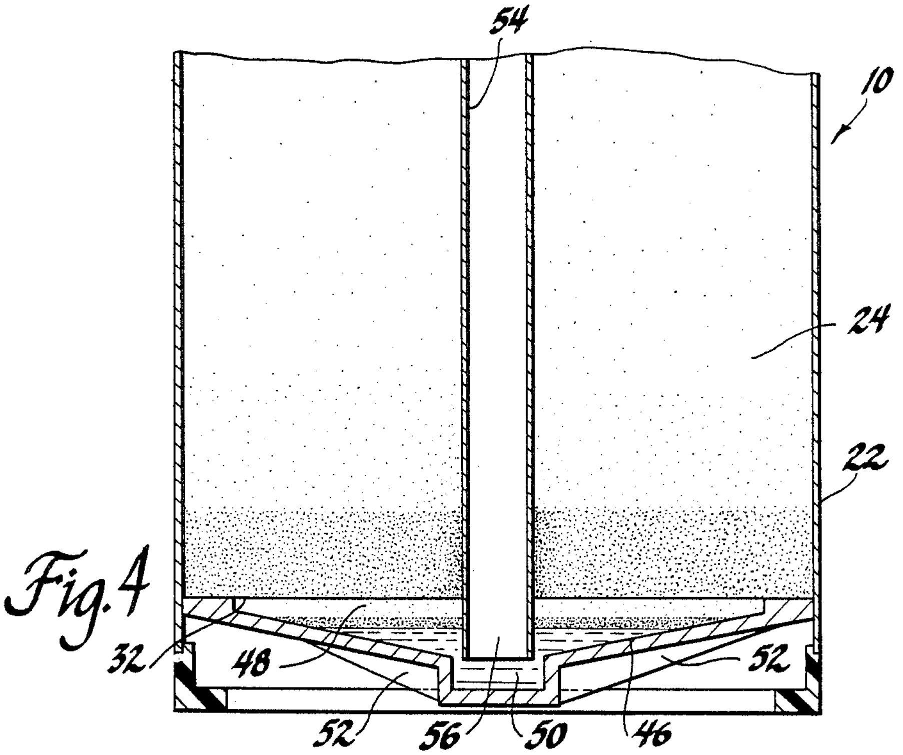
FIG. 4 is a view similar to FIG. 3, but illustrating a later stage in the fill process, when liquid has been consolidated in the apex of the cone, and after more fuel vapor has been adsorbed.

Referring next to FIG. 4, the fill process is shown at a static, essentially completed stage. The level of liquid has risen as compared to FIG. 3, and reservoir tube opening 56 is now immersed. More fuel vapors are now adsorbed and stored and, because of the central location of opening 56, they have a distribution in which the heavier concentrations are weighted toward the lower face 32, which was their entry point into bed 24. This is represented graphically by the shaded layers, which grow progressively heavier toward the lower face 32, although it would not actually be visibly apparent. Gravity, which tends to sink the heavier elements of the stored vapors, only assists in this centralized concentration and distribution. Under normal or cooler conditions, it is very possible that the upper regions of the adsorbent bed 24 would not be filled heavily, if at all, especially given the effect of gravity over time, and this is indicated visually by the lack of shading in the upper regions of bed 24. This concentration and distribution of the adsorbed vapors through bed 24 allows for a very efficient purging, as will be next described.

Figure 5:
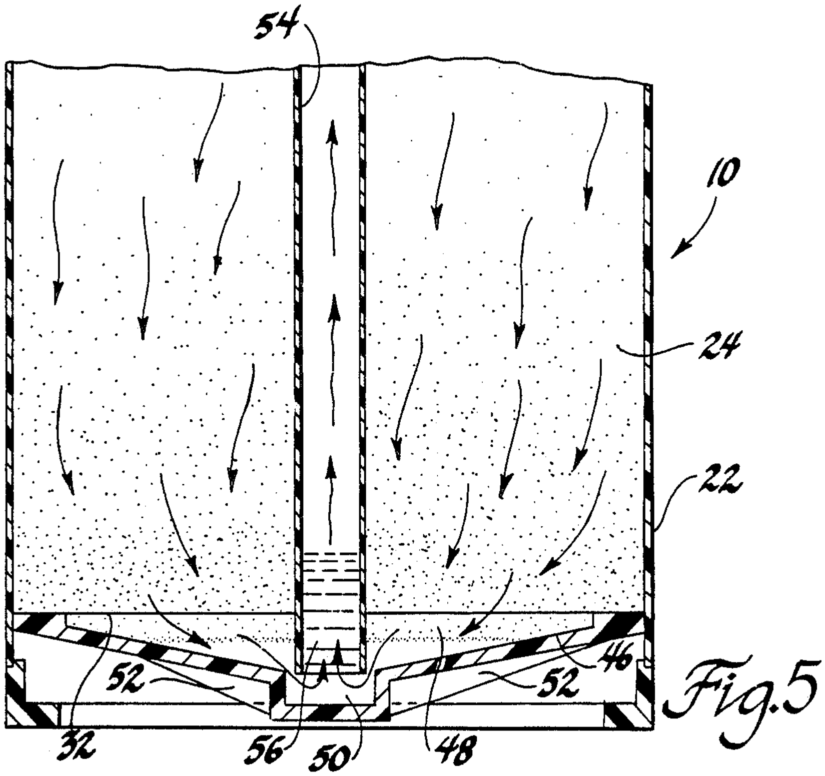
FIG. 5 is a view similar to FIG. 4, but illustrating the early stage of the purge process, as liquid is being removed from the reservoir.

Referring next to FIGS. 1, 2 and 5, when the purge process is commenced, solenoid valve 42 opens, and engine vacuum from 14 enters tube 54 through purge line fitting 38 and passage 40. The drawing of vapors directly from tank 12 through line 18 is prevented by valve 16, which serves as a check valve. When engine vacuum is introduced through the single tube 54, it first removes liquid from reservoir 50. The reservoir 50 empties from near the bottom as the liquid funnels toward and consolidates toward the central opening 56 continuously. Therefore, shell 46 and tube 54 cooperate to provide an optimal removal of liquid. Fresh air starts to enter through the upper regions of bed 24, as indicated by the arrows.

Figure 6:
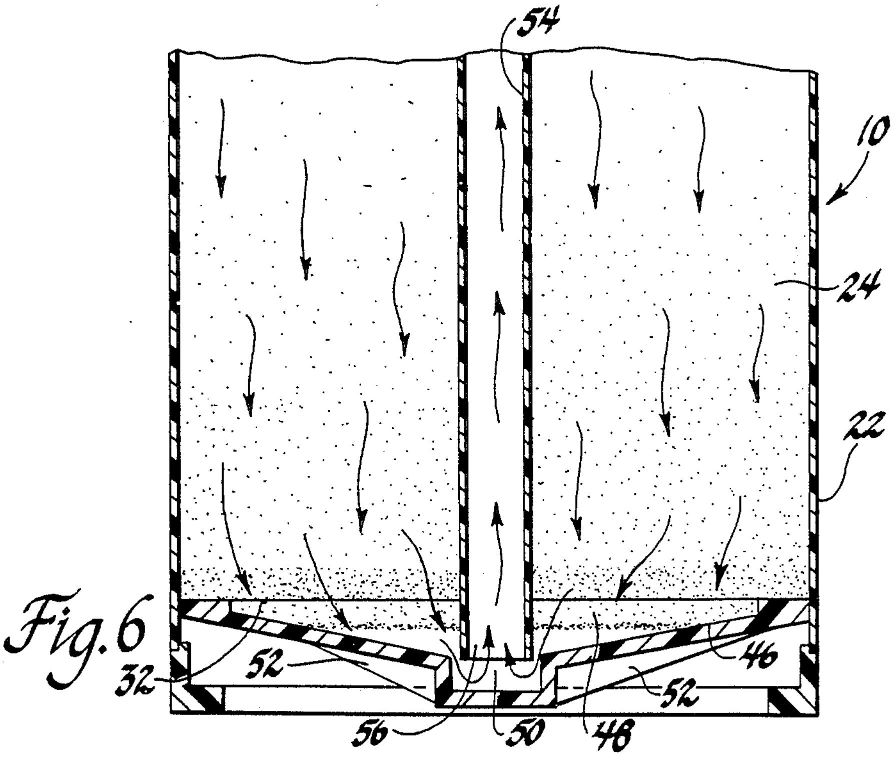
FIG. 6 is a view similar to FIG. 5, but illustrating a later stage in the purge process, after the liquid has been substantially remove, and as fuel vapors are being desorbed.

Referring next to FIG. 6, the liquid has been completely removed, because of the closeness of single tube opening 56 to the bottom of reservoir 50. Fresh air is drawn in and downwardly throughout the entire bed 24, as indicated by the arrows, desorbing the stored fuel vapors. Because of the single tube opening 56, fresh air will inevitably be drawn into and through bed 24 along substantially the same path followed by the air and fuel vapor components of the tank mixture during fill. In effect, air will be pulled through for desorption in exactly those areas where vapor was stored by adsorption. The efficiency of the desorption process and working capacity and life of the bed 24 is aided by this enforced, reverse order purging, which is visually indicated by the lightening of the layers within bed 24. Furthermore, the weighting and concentration of the stored vapors toward lower face 32 assures that those areas most in need of purge will be closest to the purge point, that is, single tube opening 56. The bottom weighted concentration of stored vapors tends to work the upper regions of bed 24 less, increasing its life and capacity. These advantages and increases in efficiency, capacity and life flow from the cooperation between the single, centrally located tube 54 and the centrally located, consolidating reservoir 50.

Variations of the preferred embodiment 10 may be made within the spirit of the invention. For example, the inverted cone shape of shell 46 could be eliminated in favor of just a depression in a flat surface to provide the reservoir 50. However, the funneling action and continuous consolidation provided by the cone shaped shell 46 very advantageously assists in the protection from liquid contamination and in the efficiency and completeness of the removal of the liquid during purge. Therefore, it will be understood that the invention is not intended to be limited to just the preferred embodiment thereof disclosed.

The embodiments of the invention in which an exclusive property or privilege is claimed are defined as follows:

1. A storage canister of the type that receives a mixture of liquid fuel, fuel vapor and air vented from a vehicle fuel tank, and in which the fuel vapor component of said mixture is stored to be later purged by vehicle engine vacuum, comprising, a generally cylindrical canister housing, a bed of fuel vapor adsorbent material located within said housing and having an upper and lower face, vent means opening from atmosphere through the top of said housing to the upper face of said absorbent bed, a shell enclosing the bottom of said housing to form a plenum beneath said adsorbent bed lower face and having a central low area that provides a central reservoir with an area substantially smaller than said lower face, a central fill-purge tube means connected both to said fuel tank and to vehicle engine vacuum and extending through said adsorbent bed lower face to an opening located centrally within said plenum and near the bottom of said reservoir, whereby, when said mixture is introduced through said tube means it enters said plenum centrally through said tube means opening, with the liquid component of said mixture collecting in said central reservoir, thereby presenting a reduced liquid surface area so as to protect said adsorbent bed from contamination by said liquid, while the fuel vapor component is adsorbed in said bed in a distribution that is concentrated more heavily toward the lower face of said bed, near said tube means opening, and, when engine vacuum is introduced through said tube means, it first removes liquid from said reservoir through said tube means opening, after which the fuel vapor is desorbed in reverse order and purged through said tube means opening as atomospheric air is drawn in through said vent means, thereby increasing the efficiency of operation and life of said adsorbent bed.

2. A storage canister of the type that receives a mixture of liquid fuel, fuel vapor and air vented from a vehicle fuel tank, and in which the fuel vapor component of said mixture is stored to be later purged by vehicle engine vacuum, comprising, a generally cylindrical canister housing, a bed of fuel vapor adsorbent material located within said housing and having an upper and a lower face, vent means opening from atmosphere through the top of said housing to the upper face of said absorbent bed, an inverted, generally cone shaped shell enclosing the bottom of said housing to form a plenum beneath said adsorbent bed lower face, with the apex of said cone providing a central liquid consolidating reservoir beneath said adsorbent bed lower face, a single fill-purge tube connected both to said fuel tank and to vehicle engine vacuum and extending through said adsorbent bed lower face to a single opening located centrally within said plenum and within and near the bottom of said reservoir, whereby, when said mixture is introduced through said single tube it enters said plenum centrally through said single tube opening, with the liquid component of said mixture consolidating continuously in said reservoir and said cone shaped shell so as to present an area of liquid that is smaller than and removed from said adsorbent bed lower face, thereby providing optimal protection of said adsorbent bed from contamination by said liquid, while the fuel vapor component is adsorbed in said bed in a distribution that is concentrated more heavily toward the lower face of said bed, near said single tube opening, and, when engine vacuum is introduced through said single tube, it first removes liquid continuously from said reservoir and cone shaped shell through said single tube opening, after which the fuel vapor is desorbed in reverse order and purged through said single tube opening as atmospheric air is drawn in through said vent means, thereby increasing the efficiency of operation and life of said adsorbent bed.

* * * * *